C. BARNHART.
FEEDER FOR THRESHING MACHINES.
APPLICATION FILED JULY 31, 1908.

955,042.

Patented Apr. 12, 1910.

Witnesses
Phil E. Barnes
J. F. Byrne

Inventor
Charles Barnhart,
By Victor J. Evans
Attorney

UNITED STATES PATENT OFFICE.

CHARLES BARNHART, OF LACLEDE, IDAHO.

FEEDER FOR THRESHING-MACHINES.

955,042.   Specification of Letters Patent.   Patented Apr. 12, 1910.

Application filed July 31, 1908. Serial No. 446,296.

*To all whom it may concern:*

Be it known that I, CHARLES BARNHART, a citizen of the United States, residing at Laclede, in the county of Bonner and State of Idaho, have invented new and useful Improvements in Feeders for Threshing-Machines, of which the following is a specification.

My invention relates to improvements in threshing machines, and it is particularly directed to improvements in the mechanism by which the straw is fed to the cylinder of the machine.

The primary object of my invention is the provision of a simple, durable and efficient feeding mechanism adapted to uniformly distribute the straw transversely of the conveyer whereby the straw is presented to the cylinder in a manner to prevent the clogging of the same and to produce the best possible results, the invention comprehending a pair of beaters.

A further object of the invention is the provision of a feeding mechanism wherein one of the beaters is adjustably mounted to permit it to be regulated to compensate for straw of different lengths.

A still further object of the invention is the provision of a feeding means which can be applied to any construction of threshing machine, and which can be manufactured and sold at a comparatively low cost.

With the above and other objects in view the invention consists in the construction, combination and arrangement of parts hereinafter fully described and claimed, and illustrated in the accompanying drawings, wherein—

Figure 1:
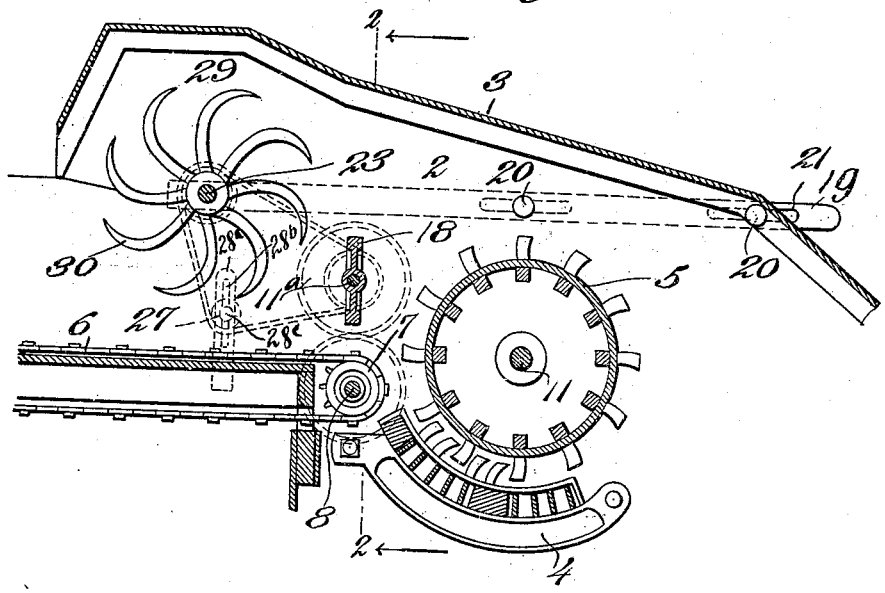
Figure 2:
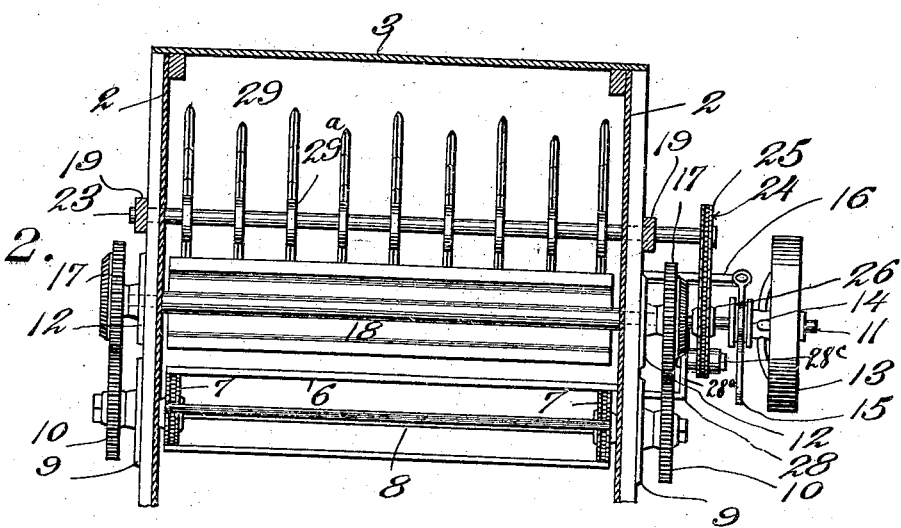

Figure 1 is a sectional view taken on the plane extending vertically and longitudinally through the front portion of a threshing machine equipped with a feeding mechanism constructed in accordance with my invention, and Fig. 2 is a vertical section taken on the plane indicated by the line 2—2 of Fig. 1, looking in the direction indicated by the arrow.

Referring to the drawings by reference numerals 2 designates the sides and 3 the top of the front portion of a threshing machine of the usual construction and form.

4 designates the concave, 5 the cylinder and 6 the conveyer of the machine. The belt of the conveyer passes over sprocket wheels 7 which are secured to a shaft 8. The shaft is journaled in bearings 9, which are secured to the sides 2 of the machine, and is provided with gear wheels 10.

A drive shaft 11 is journaled in bearings 12 which are secured to the sides 2 of the machine. The shaft 11 is provided with a belt wheel 13, which is loosely mounted thereon, and which is adapted to be connected therewith through the medium of a clutch 14, the clutch being adapted to be operated through the medium of a lever 15. The lever 15 is pivotally mounted at one end upon a bracket arm 16 which is secured to and projects laterally from one of the sides 2 of the machine. Gear wheels 17 are fixed upon the drive shaft 11 and mesh with the gear wheels 10, whereby the rotation of the drive shaft will operate the conveyer.

A beater 18 is fixed upon the drive shaft $11^a$ and consists of a pair of wings arranged in the same plane and projecting in opposite directions from the shaft. The beater 18 is coextensive in length with the transverse extent of the conveyer 6, and is disposed above the conveyer at a point adjacent its discharge end. Bars 19 are mounted upon the sides 2 of the machine for adjustment in a horizontal plane, the bars being secured in applied position through the medium of bolts 20 which are carried by the sides of the machine and which pass through elongated slots 21 formed in the bars. A shaft 23 is journaled on the front ends of the bars and extends transversely of the machine above the conveyer 6. This shaft is provided with a sprocket wheel 24 about which passes a sprocket chain 25, the sprocket chain passing over a sprocket wheel 26 secured to the drive shaft 11 and under an idler 27.

An angular bracket 28 is secured to one side of the machine, and the vertical arm $28^a$ thereof is provided with a vertically extending slot $28^b$, said slot being shown in dotted lines in Fig. 1 of the drawing. A bolt $28^c$ is mounted upon the vertical arm $28^a$ for vertical adjustment through the medium of the slot $28^b$. An idler 27 is journaled upon the bolt $28^c$. The idler 27 provides means by which all slack in the sprocket chain 25 may be taken up, and its adjustability permits the adjustment of the shaft 23 with relation to the drive shaft 11. A spreader 29 which consists of a plurality of relatively spaced sections is mounted upon the shaft 23 for movement therewith. Each of the sections of the spreader comprises a hub 29ª and a plurality of spreader arms 30. The spreader arms project radially from the hubs, and the free ends of the arms presented toward the conveyer 6 are curved in a forward direction.

The spreader 29 and the beater 18 are driven at approximately the same speed, but the peripheral speed of the spreader is greater owing to the length of the arms 30. It will also be noticed that the axis of the spreader is supported at such a distance above the plane of the axis of the beater, that the free ends of the arms 30 will be spaced above the conveyer 6 a greater distance than the free edges of the wings of the beater, assuming said arms and beater edges to be in closest proximity to the conveyer.

Now, when grain is fed to the machine, it will first be engaged between the conveyer 6 and the spreader, the action of which latter, apart from its feeding movement, will be to scatter the grain evenly over the surface of the conveyer. The grain, when it reaches the beater, will be compressed between the wings of the latter and the surface of the conveyer in an intermittent manner, being thus subjected to a positive feed motion in the direction of the cylinder and concave, and it will also be seen that while the grain is momentarily being held between the conveyer and the beater wings, the threshing action of the spreader arms will be particularly effective in scattering the grain over the surface of the conveyer and in loosening and separating wet and matted straw; thus enabling loose and damp grain and grain that has become tangled or otherwise difficult to operate upon, to be fed to the machine in an efficient manner.

The adjustability of the spreader 29 permits it to be regulated to compensate for different lengths of straw. If the straw is shorter than usual the spreader 29 is adjusted rearwardly from its normal position, that is in the direction of the beater 18. If the straw is longer than usual the spreader is adjusted forwardly from its normal position, that is in a direction away from the beater 18.

It should be apparent from the above description, taken in connection with the accompanying drawings, that I provide a feeding mechanism for threshing machines which is simple, durable and efficient, which may be manufactured and sold at a comparatively low cost and which is adapted to feed the straw to the cylinder in a manner to produce the best possible results and to prevent the clogging of the machine.

Having thus described the invention what I claim as new is:

In a feeding device for threshing machines, an endless conveyer, a pair of arms supported for longitudinal adjustment, a spreader supported for rotation upon said arms, a beater supported for rotation in relatively fixed bearings intermediate the spreader and the cylinder's sprocket wheels upon the shafts of the spreader and the beater, a bracket, an idler supported for vertical adjustment upon the bracket, a link belt passing over the idler and over the sprockets upon the shafts of the spreader and the beater, and means for transmitting motion between the conveyer and the beater.

In testimony whereof I affix my signature in presence of two witnesses.

CHARLES BARNHART.

Witnesses:
CHARLES LAKIN,
B. M. BRANFORD.